United States Patent [19]

Woolworth et al.

[11] 3,728,812
[45] Apr. 24, 1973

[54] TROLLING BUCKET

[75] Inventors: Richard G. Woolworth; Anthony J. Souza, both of Lancaster; Harper Landell, Fort Washington, all of Pa.

[73] Assignee: Woodstream Corporation, Lititz, Pa.

[22] Filed: Ap. 19, 1971

[21] Appl. No.: 133,631

[52] U.S. Cl. ............................................ 43/55, 43/56
[51] Int. Cl. ............................................... A01k 97/04
[58] Field of Search ........................... 43/55, 56, 54.5, 43/54.5 A

[56] References Cited

UNITED STATES PATENTS

| | | | |
|---|---|---|---|
| 3,009,281 | 11/1961 | Unger | 43/56 |
| 3,367,061 | 2/1968 | Brandemihl et al. | 43/55 |
| 3,357,127 | 12/1967 | Barradale | 43/55 |
| 3,593,453 | 7/1971 | Bishop et al. | 43/55 |

*Primary Examiner*—Robert Peshock
*Assistant Examiner*—James H. Czerwonky
*Attorney*—Holman & Stern

[57] ABSTRACT

A trolling bucket for holding live minnows or similar live bait and adapted to be towed behind a boat, comprising a hollow shell of resilient polyethylene or similar material and having a streamlined hull-like bottom surface portion. A pair of closed pockets or chambers disposed on either side of the interior of the hollow shell, generally at the water line, are filled with a foamed plastic material such as polyurethane, to provide flotation of the bucket while being towed. A weight is provided to orient the trolling bucket when floating and an inwardly pivotable access door is provided in the top surface of the shell, to provide access to the interior thereof. The forward end portion of the bucket includes an elongated recess into which handle means for the bucket are slidably retractable so as to be substantially flush with the exterior surface of the bucket. The lower wall portion has an elongated channel which forms a keel-like rib on the exterior of the bucket.

2 Claims, 9 Drawing Figures

Patented April 24, 1973
3,728,812
2 Sheets-Sheet 1
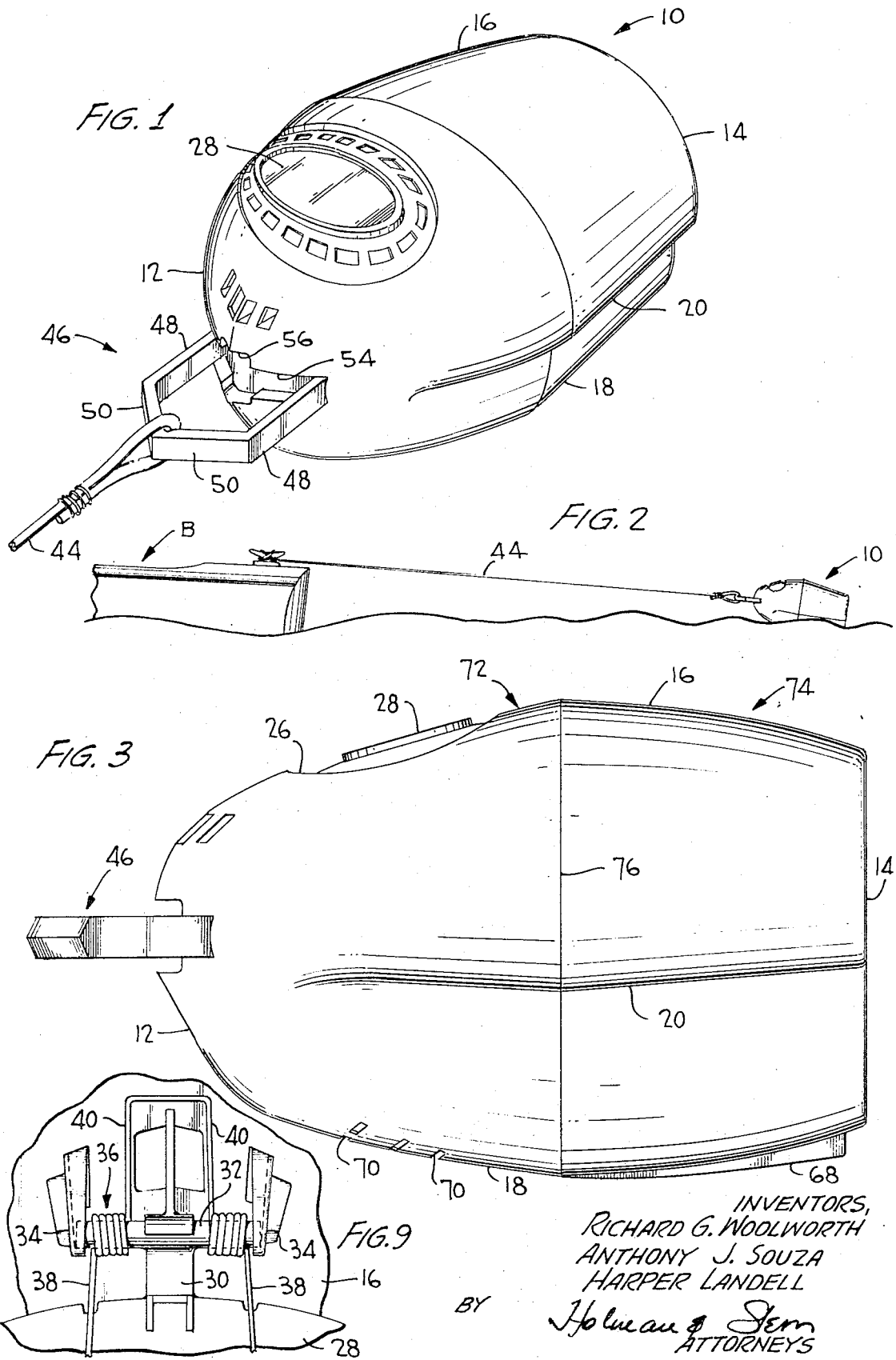
INVENTORS,
RICHARD G. WOOLWORTH
ANTHONY J. SOUZA
HARPER LANDELL
BY Holman & Stern
ATTORNEYS Patented April 24, 1973
3,728,812
2 Sheets-Sheet 2
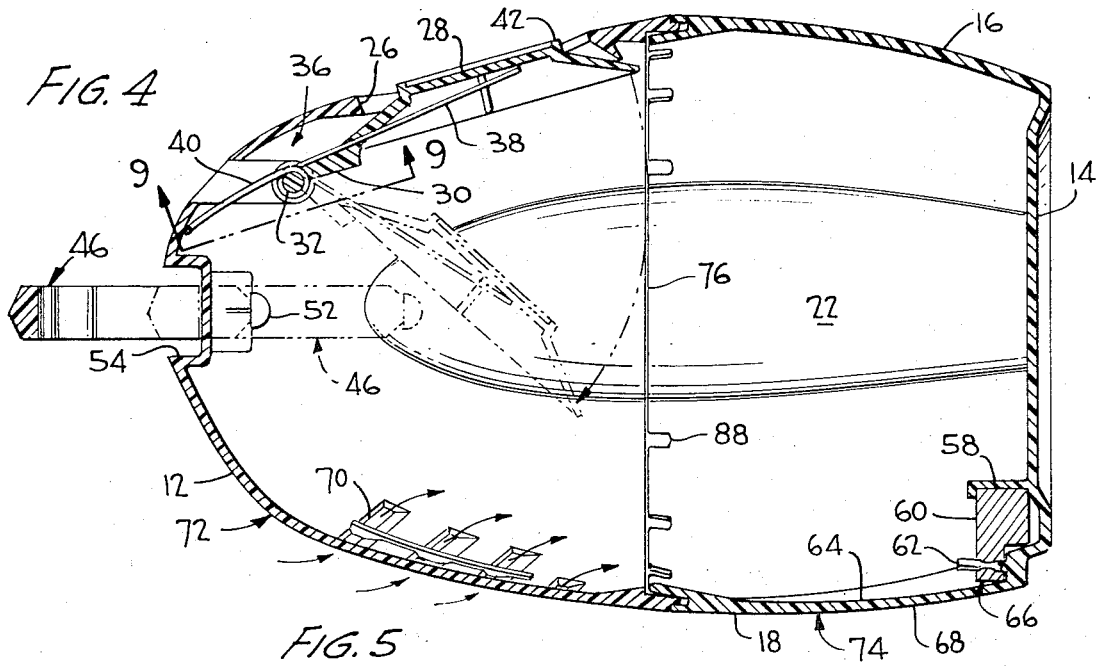
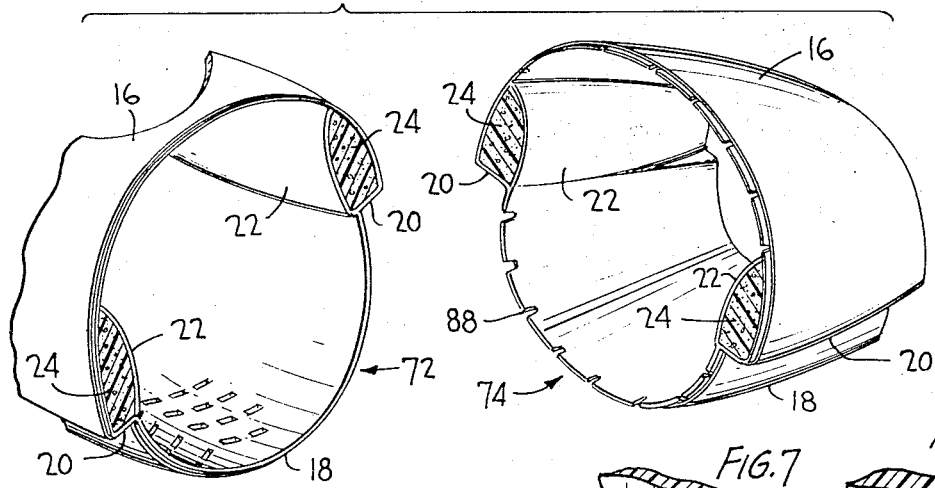
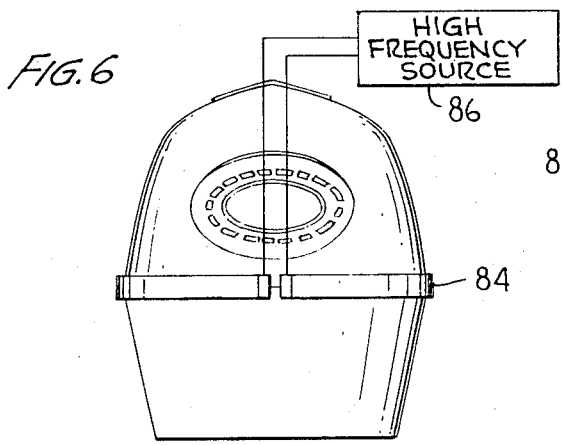
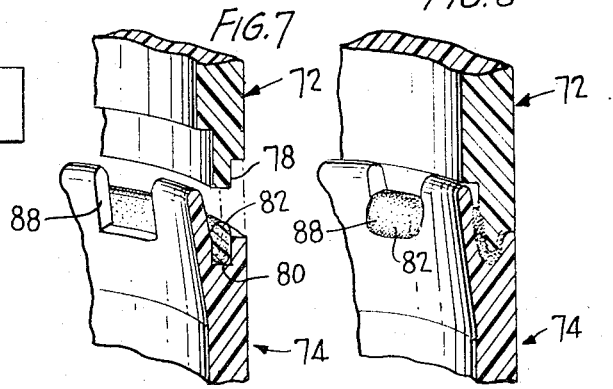
INVENTORS,
RICHARD G. WOOLWORTH
ANTHONY J. SOUZA
HARPER LANDELL
BY Holman & Stern
ATTORNEYS

TROLLING BUCKET

BACKGROUND OF THE INVENTION

This invention relates generally to the field of containers, and more particularly to a plastic flotatable container for holding live bait while being towed behind a boat, customarily referred to as a trolling bucket.

Trolling buckets per se are well known in the art, and generally comprise a container in which live bait such as minnows, together with a quantity of water to keep the bait fresh, may be carried, generally by towing the same behind a boat, in order to keep the live bait fresh until ready for actual use. Such known trolling buckets have generally been substantially closed, and have included an access opening for removing or inserting bait to or from the interior thereof, such access opening normally closed by a door member fitting therein, which door member was capable of being pivoted to an open position in the interior of the bucket.

Such prior known buckets have been moderately successful, particularly where it has been desired to ensure an adequate supply of live bait for fishing. However, they have also been subject to several striking drawbacks, among which has been a lack of adequate assurance that the bucket is flotatable in a reliable manner. In particular, prior known trolling buckets have been rendered flotatable generally through the provision of closed air spaces or pockets secured to the bucket, either on the exterior or interior thereof, which air pockets served to buoy the bucket upon the water. However, in the event of leakage of air from such air chambers or pockets, or conversely, of water into such pockets, such devices rapidly lost their buoyancy and thus became essentially useless.

A further disadvantage of such known buckets has been that they did not ride well in the water, particularly in rough or choppy water, where wave action was particularly manifest. In particular, they have exhibited the common drawback that they tended to bounce heavily in such rough or choppy water, thereby tending to bruise or damage the live bait therein, as well as raising the danger that the water therein would be lost.

Finally, a further disadvantage of such trolling buckets is that the access door, permitting access to the interior of the bucket, generally included hinge means for pivotally connecting the door to the bucket, such hinge means generally being constructed of steel pins or similar pivot members, with the result that such hinge members proved quite vulnerable to damage from oxidation from rust, particularly in the salt-water environment in which trolling buckets are most commonly utilized.

SUMMARY OF THE INVENTION

With the above background in mind, it is therefore a primary object of the present invention to provide a trolling bucket of the general character described, which overcomes the above-mentioned drawbacks of prior known trolling buckets.

Specifically, it is an object of the present invention to provide such a trolling bucket which is sturdy, easy and economical to manufacture, and which performs in the water in a more satisfactory manner than has been previously possible with known trolling buckets.

Still more specifically, it is a primary object of the present invention to provide such a trolling bucket including flotation means which are substantially insensitive to leaks or punctures, thereby assuring that the bucket will be incapable of losing substantially any of its flotation ability.

It is a further object of the present invention to provide a trolling bucket which has, at least on its bottom surface portion, a streamlined hull-like configuration, in order to provide smooth towing characteristics in rough or choppy water.

It is yet a further object of the present invention to provide such a trolling bucket having an access opening and a pivotable door normally closing such access opening, which door is pivotally connected to the bucket by rust-proof pivotal hinge means.

These, as well as other objects which will become apparent as the description proceeds, are implemented by the inventive trolling bucket comprising a hollow shell of resilient polyethylene or similar materials and having a stream-lined hull-like bottom surface portion, preferably including an outwardly protruding stabilizing rib along the longitudinal center line thereof at at least the rear portion. An access opening, preferably of rounded configuration, is provided in the top surface of the bucket, preferably in the forward portion thereof, and includes a door member which is pivotally connected to the bucket by pivot pin means formed as an integral part of the door member, cooperating with receiving bearing means formed integrally with the interior of the bucket, such pivoting means and bearing means preferably being formed of a plastic material. A pair of flotation compartments or pockets are provided on the interior of the bucket, and are filled with a low-density foamed cellular plastic material such as foamed polyurethane or the like.

In a preferred method of manufacturing the bucket, according to the present invention, the bucket is formed from a pair of cooperating front and rear shell half members, joined to each other by complementary peripheral flange portions along a transverse joint line, the flotation pockets or chambers extending both forwardly and rearwardly of such transverse joint lines, i.e. extending into both of the shell half members. A heat-activated adhesive or plastic material is applied to the flange portion of one or both of the members, and the portion of the flotation pockets within one of the shell half members is partially filled with an expandable foam plastic material such as polyurethane or the like. The shell half members are then joined to each other by their cooperating mating flange portions, and heat is applied to such joint as through a high-frequency induction coil, in order to set the plastic or adhesive material; substantially simultaneously, the expandable plastic material within the flotation chambers expands and foams to fill such flotation chambers.

BRIEF DESCRIPTION OF THE DRAWINGS

The invention itself will be better understood, and additional features, objects and advantages thereof will become apparent, from the following detailed description of the preferred embodiment of the invention, taken in conjunction with the accompanying drawings, in which:

FIG. 1 is a pictorial view of a trolling bucket constructed according to the present invention;

FIG. 2 is a side pictorial view, on a reduced scale, showing the manner in which the inventive bucket may be towed behind a boat;

FIG. 3 is an enlarged side elevational view of the bucket of FIG. 1;

FIG. 4 is a longitidinal vertical sectional view through the bucket of FIG. 1;

FIG. 5 is an exploded pictorial view of the opposed shell half members, following assembly;

FIG. 6 illustrates schematically a method of performing one step in the manufacture of the inventive bucket;

FIGS. 7 and 8 are greatly enlarged views of the portion of the joint between the shell half members, showing two successive stages in the manufacture of the bucket; and FIG. 9 is an enlarged view of a portion of the interior of the bucket, showing details of the hinge and spring arrangement for the door thereof.

DETAILED DESCRIPTION OF THE PREFERRED EMBODIMENT OF THE INVENTION

Referring now to the drawings, and initially to FIGS. 1–3, there is illustrated a preferred embodiment of the inventive trolling bucket, which may be used for keeping live bait such as minnows fresh, as by being towed behind a boat. As shown, the trolling bucket, designated generally by reference numeral 10, is in the form of a generally closed hollow plastic shell member, whose outer surface includes a rounded portion 12 at the forward end thereof, when the bucket is in the substantially horizontal position shown, as when being towed behind a boat (FIG. 2); a generally flat, transverse rear wall portion 14 spaced longitudinally from the rounded forward end portion 12; and rounded upper and lower wall portions 16 and 18, respectively.

As perhaps best seen in FIG. 5, the upper wall portion 16 of the hollow plastic shell member has a greater arc of curvature than the lower wall portion 18, and is connected thereto by a pair of generally horizontal inwardly extending wall portions 20 respectively disposed at either side of the bucket. Thus, it will be seen that the trolling bucket according to the present invention, particularly the lower wall portion thereof, has a hull-like configuration similar to that of a boat; i.e., the bucket has a comparatively narrower lower wall portion 18 and a comparatively wider upper wall portion 16, the generally horizontal inwardly extending wall portions 20 defining essentially a pair of outwardly extending wing-like portions or extensions protruding to either side of the lower wall portion 18 of the bucket.

In order to make the trolling bucket highly floatable, and to permit the bucket to retain its high degree of flotation despite possible punctures or other leakages, means are provided in the interior of the bucket defining a plurality of flotation compartments internally of the shell member adjacent each of the respectively inwardly extending wall portions 20, each of such flotation compartments being filled with a foamed flotation material. Specifically, a pair of interior wall means are provided, each of such interior wall means comprising an interior wall member 22. Each such interior wall member 22 defines between itself and the interior surface of the trolling bucket, adjacent the inwardly extending wall portion 20, a closed flotation chamber, and each of these interior wall members 22 further preferably extends from the intersection of the lower wall portion 18, at about the point where such lower wall portion 18 merges with a respective one of the inwardly extending wall portions 20, in an arcuate manner upwardly and outwardly and terminates at the upper wall portion 16 above the respective inwardly extending wall portion 20. Thus, in the embodiment illustrated, each of the flotation compartments has a generally ogive or arch-shaped configuration, although it is clear that other configurations for the flotation chambers would work equally well. It should further be appreciated, particularly from FIG. 5, that in the preferred embodiment illustrated, each of the interior wall members 22 forms a smooth upward continuation of the interior surface of the lower wall portion 18.

Each of the flotation chambers or compartments is substantially filled with a foamed flotation material 24, which flotation material preferably comprises a light weight foamed plastic material such as foamed polyurethane or the like. As will be described in greater detail at a later point, during manufacture and assembly of the inventive bucket, each of the flotation compartments or chambers is initially filled with a small quantity of the flotation material in an unfoamed state, such material being particularly adapted to spontaneously expand into its foamed state following a time delay, such expansion substantially filling each of the respective flotation compartments. Thus, through the use of such polyurethane foam or similar foamed plastic material, it will be appreciated that the bucket will retain its efficient flotation characteristics even in the event that the flotation compartments are punctured or otherwise subjected to openings therein, inasmuch as the presence of the foamed plastic material 24 precludes the loss of air therefrom or the entry of water thereinto, as has been a characteristic of prior known trolling buckets.

The tolling bucket according to the present invention further includes opening means for providing access to the interior of the bucket, as for inserting bait thereinto or removing the bait therefrom, and door means for normally closing such access opening. To this end, the upper wall portion 16 has an access opening 26 therethrough, adjacent the forward end portion 12, to provide access to the interior bucket, such access opening 26 preferably being rounded in configuration and advantageously having an ovate form. A door member 28, preferably formed of a comparatively rigid plastic material, is pivotally secured to the interior of the upper wall portion 16, adjacent such access opening 28, so that it normally closes said access opening 26. The door member 28 preferably has a configuration similar to that of the access opening 26, but of a larger dimension than such opening, and in the embodiment illustrated and described, the door 28 is preferably likewise ovate in configuration. As best seen in FIGS. 4 and 9, the door member 28 has secured thereto, by means of an integral leg member 30, a transverse pivot pin member 32 which is likewise formed of a comparatively rigid plastic material, and is preferably moulded integrally with the door member 28 and leg portion 30. Transversely spaced receiving bearing means 34 are provided secured to the interior of the upper wall portion 16, adjacent the opening 26, and preferably formed integrally with the hollow plastic shell member.

These bearing members 34 (FIG. 9) respectively receive therein the opposite ends of the pivot pin member 32 secured to the door member 28, and permit the door 28 to be pivoted between a first or upper position, illustrated in solid lines in FIG. 4, wherein the door member 28 closes the access opening 26 and is substantially flush with the exterior surface of the bucket, and the second or lower position, illustrated in phantom lines, away from said opening to permit access to the interior of the bucket. In this manner, the door 28 may readily be opened to permit bait to be removed from the interior of the bucket, or to be placed thereinto, as desired.

The bucket further includes biasing means for rotationally biasing the door member 28 towards its first or upper position, closing the access opening. Towards this end, said biasing means preferably comprises a torsion spring 36 which is on the pivot pin member 32, and which includes a first pair of leg portions 38 which bear against the underside of the door member 28, and a second pair of leg portions 40 which bear against the interior of the rounded forward end portion 12. In this manner, it will be appreciated that the door member 28 is normally biased counter-clockwise, as seen in FIG. 4, towards its upper position to rest against the outer walls of the bucket adjacent the access opening 26, to thereby close the access opening, and may be readily pivoted inwardly against the force of such torsion spring to permit access to the interior of the bucket for purposes noted above. To substantially reduce the possibility that a person may catch his hand between the peripheral edge of the opening and the edge of the door, particularly when withdrawing the hand from the interior of the bucket, the door member 28 further includes a raised rib 42 on the exterior surface thereof, which rib 42 is preferably ovate in configuration and is smaller in circumference than the circumference of the access opening 26.

By providing the door member 28, its pivot pin member 32, and the receiving bearing means 34 of plastic materials such as polystyrene or polyethylene, it will be appreciated that the present invention completely eliminates any possibility of rusting of the hinge means defined by such pivot pin member and receiving bearing means, inasmuch as no metal parts are utilized except for the torsion spring 36, which may advantageously be constructed of stainless steel or similar non-rusting material. This represents a marked advantage over prior known trolling buckets, in which at least a portion of such hinge means have been constructed of steel or similar metal construction, and have further been exposed to the exterior elements, thus presenting considerable probability of deterioration due to rusting or other corrosion.

As is customary with trolling buckets of the general character of this invention, the present inventive bucket is adapted to either be towed behind a boat during the actual trolling operation, as illustrated in FIG. 2, wherein the bucket 10 is shown schematically as being towed behind a boat B by a tow line or similar line 44. The bucket is further adapted to be carried in a substantially upward position for use as a standard bucket. To serve both of these aforementioned purposes, there is provided secured to the bucket at the forward end portion thereof, handle means 46 comprising a handle member, preferably of a comparatively rigid plastic material. The handle member 46, in the preferred illustrated embodiment, comprises a pair of forwardly extending leg members 48, and a pair of forwardly and inwardly extending inclined leg portions 50 which meet each other at generally the longitudinal central axis of the bucket. Preferably, the forwardly extending leg portions 48 are slidingly received within corresponding openings (not shown) extending through the forward end portion of the bucket, so that the handle means 46 may be slidingly extended or retracted by such leg portions 48 slidingly passing through said such respective openings. The leg portions 48 further include at their inner ends, in the interior of the bucket, transversely extending stop portions 52 respectively secured to each of the leg portions 48, and which limit forward or outward sliding movement of the handle means 46 by abutting against the interior surface of the forward end portion 12 when the handle is in its outer-most or fully extended position illustrated in FIGS. 1 and 3, and shown in solid lines in FIG. 4. The forward end portion 12 of the hollow plastic shell member further preferably includes a transverse elongated recess 54 in the exterior surface thereof, such recess corresponding in configuration generally to the forwardly and inwardly inclined leg portions 50 of the handle means, whereby the handle means may be slidingly retracted into such recess, substantially flush with the exterior surface of the forward end portion 12. The elongated recess 54 may further include a widened portion 56 generally centrally thereof, to permit the forward end of the handles to be readily grasped and extended from the retracted position illustrated in phantom lines in FIG. 4.

While the inventive trolling bucket as described has a high degree of stability, particularly when partially filled with water and live bait, means are preferably provided for weighting the lower rear portion of the bucket to provide stability to the bucket when it is being towed in the water. Accordingly, there is provided a pocket means defined in the interior of the shell member, adjacent the intersection of the rear wall portion 14 and the lower wall portion 18, and a weight secured within the pocket means to thus lower the center of gravity of the bucket and maintain the bucket oriented in a proper upright position when being towed in the water. Such pocket means is defined by a transverse, generally horizontal wall member 58, spaced upwardly from the bottom of the lower wall portion 18 and extending forwardly a short distance from the rear wall portion 14, and a pair of generally vertical wall members (not shown) connecting the respective opposite ends of the transverse wall member 58 with the lower wall portion 18. The three wall members mentioned above, together with the rear-most end of the lower wall portion 18 and the lower-most portion of the rear wall portion 14, define essentially a five-sided box-like pocket means open at its forward end, and there is disposed within this pocket means a weight 60 of lead or other suitable heavy material, which serves to stabilize the boat in the manner previously described. In order to secure the weight in position, to prevent its becoming loose, a forwardly extending pin or post member 62 may be provided, integral with and extending forwardly from the rear wall portion 14; a suitable door may be provided in the weight 60 to fit over such post or pin member 62, and the weight, particularly if it is of a comparatively soft material such as lead, may then be crimped about the post to securely fasten it within the pocket member. The pocket means is further defined in part by an elongated channel means 64 defined in said lower wall portion generally centrally thereof and extending longitudinally of the bucket, defining on the interior of the bucket at the lower rear portion thereof a generally U-shaped channel in which a downwardly protruding portion 66 of the weight 60 may be disposed. The exterior of such channel 64 will thereby further define a downwardly protruding, longitudinally and centrally extending keel-like rib 68 on the exterior of the bucket, which rib 68 will further assist in stabilizing the bucket when being towed in the water, much in the same manner as the keel of a boat.

In order to provide a substantially continuous circulation of water into and through the interior of the bucket, when being used to contain live bait or the like, there are provided a plurality of slots 70 in the lower wall portion 18, preferably adjacent the forward end thereof, which slots are preferably inclined upwardly and inwardly, towards the interior of the bucket, to continually scoop or draw in water from the exterior of the bucket to the interior, to continually provide a fresh supply of water on the interior.

In the preferred method of manufacturing the inventive trolling bucket, as described above, the hollow plastic shell member is initially formed, as by moulding or other suitable method, as a pair of respective forward and rearward shell half members, respectively designated as 72 and 74, and which are adapted to be connected along a generally central transverse joint line 76 by cooperating tongue and groove means extending peripherally about said joint line on each of said respective shell half members. As seen in FIGS. 4 and 5, the flotation compartments or chambers, which are to be filled with the foamed flotation material 24, traverse the joint line 76, and hence each of the shell half members 72 and 74 is provided with respective flotation compartment portions open at one end thereof at the joint line, each of the flotation compartment portions extending inwardly of its respective shell half member and being closed at its opposite end, so that the compartment portions form closed flotation compartments when the shell half members are assembled. Accordingly, one of the two flotation compartment portions of each of the ultimate closed flotation compartments is partially filled with a self-expanding foamable plastic flotation material which is particularly adapted to expand after a pre-determined delay, a suitable material for the flotation material, for example, advantageously comprising foamable polyurethane. Following such partial filling of the flotation compartment sections with the foamable flotation material, the groove means 80 of the tongue and groove means has applied thereto a thermoplastic material impregnated with a particulate metal, such thermoplastic material advantageously comprising an extrudable polyethylene impregnated with iron shavings or iron filings, this product being commercially available in extrudable tubes or the like. Following this, the shell half members 72 and 74 are then joined with their respective tongue and groove means in cooperating engagement, as illustrated in FIG. 8; while the tongue means 78 is illustrated as being provided on the forward shell half member 72, and the groove means 80 is illustrated as being provided on the rearward shell half member 74, it is obvious that the reverse arrangement could be utilized, if desired.

Following assembly of the shell half members, a high-frequency magnetic field is applied to the assembled article in the vicinity of such joint line, preferably by surrounding such joint line with an annular conductive band or the like 84 connected to a source of high-frequency current 86 to excite the band and generate such high-frequency magnetic field. This high-frequency magnetic field will excite and heat the particulate metal, such as iron filings, and will thereby cause the thermoplastic material, such as polyethylene, to melt and to flow within such tongue and groove means. Thereafter, the assembled article is removed from the influence of the magnetic field, thereby permitting the thermoplastic material to set and bond the shell-like members together.

If the thermoplastic material 82 were permitted to flow or seep outwardly between the cooperating tongue and groove means to the exterior surface of the bucket adjacent the joint line, while in its heated and melted state, it is clear that such exterior flow would result in an unsightly accumulation of such material on the exterior of the bucket, thereby detracting from the esthetic appearance thereof. Additionally, there would be created the danger that the particulate metal such as iron filings, embedded in the thermoplastic material, would short-circuit the conductive band 84 by coming into contact with such band. Accordingly, means are provided defining expansion spaces for the thermoplastic material 82, to permit any excess thermoplastic material to flow inwardly into the bucket in a harmless manner. Such means comprise a plurality of recesses or openings 88 in the interior surface of the groove means 80 of the tongue and groove means, such recesses 88 opening interiorly of the respective shell half member 72. Thus, as shown in FIG. 8, any excess thermoplastic material 82 will flow inwardly through one or more of such recesses 88 to the interior of the bucket, thereby substantially precluding any flow of the material to the exterior of the bucket.

After the shell half members 72 and 74 have been joined, and generally concurrently with the heating and subsequent setting of the thermoplastic material 82, the components of the flotation material 24 react to foam and expand this material, whereby the material expands to substantially fill each of the respective flotation chambers or compartments. As mentioned, a suitable material for this purpose comprises foamable polyurethane, which is generally available as a two-component mixture, the components reacting when mixed to foam the material. Thus, advantageously, the two components can be mixed at the moment when they are inserted.

Through the provision of the inventive trolling bucket and method of making same, described above, it is believed that all of the objects set forth at the outset of the specification have been successfully fulfilled.

We claim:

1. A trolling bucket for carrying live bait or the like, comprising a generally closed hollow plastic shell member having a rounded forward end portion, a longitudinally spaced rear wall portion, and rounded upper and lower wall portions, said upper wall portion having a greater arc of curvature than said lower wall portion and being connected to said lower wall portion by a pair of generally inwardly wall portions respectively disposed at either side of the bucket, whereby said lower wall portion of said shell member has a hull-like configuration; interior wall means defining a pair of flotation compartments internally of said shell member adjacent said respective inwardly extending wall portions, said flotation compartments having foamed flotation material therein; said upper wall portion further having an opening therethrough adjacent said forward end portion to provide access to the interior of the bucket; door means pivotally secured to the interior of said upper wall portion adjacent said opening and adapted for pivotal movement between a first position in which it substantially closes said opening and a second position within the bucket away from said opening; biasing means normally urging said door means towards said first position; and handle means secured to said forward end portion of said shell member and adapted to permit the bucket to be carried by a person, or to be towed behind a boat, said forward end portion including an elongated recess therein, said handle means being slidably retractable into said elongated recess substantially flush with the exterior surface of said forward end portion.

2. A trolling bucket for carrying live bait or the like, comprising a generally closed hollow plastic shell member having a rounded forward end portion, a longitudinally spaced rear wall portion, and rounded upper and lower wall portions, said upper wall portion having a greater arc of curvature than said lower wall portion and being connected to said lower wall portion by a pair of generally inwardly extending wall portions respectively disposed at either side of the bucket, whereby said lower wall portion of said shell member has a hull-like configuration; interior wall means defining a pair of flotation compartments internally of said shell member adjacent said respective inwardly extending wall portions, said flotation compartments having foamed flotation material therein; said upper wall portion further having an opening therethrough adjacent said forward end portion to provide access to the interior of the bucket; door means pivotally secured to the interior of said upper wall portion adjacent said opening and adapted for pivotal movement between a first position in which it substantially closes said opening and a second position within the bucket away from said opening; biasing means normally urging said door means towards said first position; and a pocket means defined in the interior of said shell member adjacent the intersection of said rear wall portion and said lower wall portion, and a weight secured within said pocket means to stabilize and orient the trolling bucket when being towed in the water, said pocket means being partially defined by an elongated channel means extending centrally and longitudinally of at least a portion of said lower wall portion to form a keellike rib on the exterior of said bucket.

* * * * *